(12) United States Patent
Jose et al.

(10) Patent No.: US 9,769,017 B1
(45) Date of Patent: Sep. 19, 2017

(54) IMPENDING CONTROL PLANE DISRUPTION INDICATION USING FORWARDING PLANE LIVELINESS DETECTION PROTOCOLS

(71) Applicant: Juniper Networks, Inc., Sunnyvale, CA (US)

(72) Inventors: Jimmy Jose, Hosur (IN); Reji Thomas, Bangalore (IN); Satish Dattatri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 177 days.

(21) Appl. No.: 14/498,607

(22) Filed: Sep. 26, 2014

(51) Int. Cl.
*H04L 12/26* (2006.01)
*H04L 12/24* (2006.01)

(52) U.S. Cl.
CPC ...... *H04L 41/0686* (2013.01); *H04L 41/0654* (2013.01); *H04L 41/0695* (2013.01); *H04L 43/0811* (2013.01)

(58) Field of Classification Search
CPC ...... H04L 45/22; H04L 45/02; H04L 12/2697
See application file for complete search history.

(56) References Cited

U.S. PATENT DOCUMENTS

| | | |
|---|---|---|
| 5,253,248 A | 10/1993 | Dravida et al. |
| 5,613,136 A | 3/1997 | Casavant et al. |
| 5,721,855 A | 2/1998 | Hinton et al. |
| 5,826,081 A | 10/1998 | Zolnowsky |

(Continued)

FOREIGN PATENT DOCUMENTS

| | | |
|---|---|---|
| EP | 1367750 A1 | 12/2003 |
| EP | 1861963 A2 | 12/2007 |

(Continued)

OTHER PUBLICATIONS

"ActiveXperts Ping backgrounds (PING is part of the ActiveSocket Toolkit)," ActiveSocket Network Communication Toolkit 2.4, Activexperts, www.activexperts.com/activesocket/toolkits/ping.html, last printed Nov. 10, 2005, 3 pp.

(Continued)

*Primary Examiner* — Rasheed Gidado
(74) *Attorney, Agent, or Firm* — Shumaker & Sieffert, P.A.

(57) ABSTRACT

Techniques are described for providing an indication of an impending control plane disruption of a router using forwarding plane liveliness detection protocols. A forwarding plane of the router outputs liveliness detection messages that, when received by a peer router, provide an indication that the forwarding plane is operational and able to forward packets. When constructing the liveliness detection messages, the forwarding plane may embed additional information indicative of any impending disruption in the control plane of the network device. In this way, the forwarding plane of the transmitting router provides an indication to the peer router that, although currently operational, the control plane of the router may in the near term become non-operational. The peer router, in response to receiving an enhanced liveliness detection message indicating an impending control plane disruption, suppresses a recovery action otherwise triggered by a loss of communication with a control plane of the network device.

19 Claims, 5 Drawing Sheets

(56) References Cited

U.S. PATENT DOCUMENTS

| | | |
|---|---|---|
| 5,848,128 A | 12/1998 | Frey |
| 5,933,601 A | 8/1999 | Fanshier et al. |
| 6,052,720 A | 4/2000 | Traversat et al. |
| 6,101,500 A | 8/2000 | Lau |
| 6,148,337 A | 11/2000 | Estberg et al. |
| 6,163,544 A | 12/2000 | Andersson et al. |
| 6,173,411 B1 | 1/2001 | Hirst et al. |
| 6,212,559 B1 | 4/2001 | Bixler et al. |
| 6,223,260 B1 | 4/2001 | Gujral et al. |
| 6,255,943 B1 | 7/2001 | Lewis et al. |
| 6,263,346 B1 | 7/2001 | Rodriquez |
| 6,272,537 B1 | 8/2001 | Kekic et al. |
| 6,304,546 B1 | 10/2001 | Natarajan et al. |
| 6,310,890 B1 | 10/2001 | Choi |
| 6,374,329 B1 | 4/2002 | McKinney et al. |
| 6,389,464 B1 | 5/2002 | Krishnamurthy et al. |
| 6,393,481 B1 | 5/2002 | Deo et al. |
| 6,405,289 B1 | 6/2002 | Arimilli et al. |
| 6,453,430 B1 | 9/2002 | Singh et al. |
| 6,466,973 B2 | 10/2002 | Jaffe |
| 6,477,566 B1 | 11/2002 | Davis et al. |
| 6,477,572 B1 | 11/2002 | Elderton et al. |
| 6,480,955 B1 | 11/2002 | DeKoning et al. |
| 6,502,131 B1 | 12/2002 | Vaid et al. |
| 6,507,869 B1 | 1/2003 | Franke et al. |
| 6,510,164 B1 | 1/2003 | Ramaswamy et al. |
| 6,516,345 B1 | 2/2003 | Kracht |
| 6,529,941 B2 | 3/2003 | Haley et al. |
| 6,542,934 B1 | 4/2003 | Bader et al. |
| 6,563,800 B1 | 5/2003 | Salo et al. |
| 6,584,499 B1 | 6/2003 | Jantz et al. |
| 6,618,360 B1 | 9/2003 | Scoville et al. |
| 6,636,242 B2 | 10/2003 | Bowman-Amuah |
| 6,662,221 B1 | 12/2003 | Gonda et al. |
| 6,681,232 B1 | 1/2004 | Sistanizadeh et al. |
| 6,684,343 B1 | 1/2004 | Bouchier et al. |
| 6,725,317 B1 | 4/2004 | Bouchier et al. |
| 6,738,908 B1 | 5/2004 | Bonn et al. |
| 6,751,188 B1 | 6/2004 | Medved et al. |
| 6,757,897 B1 | 6/2004 | Shi et al. |
| 6,804,816 B1 | 10/2004 | Liu et al. |
| 6,816,897 B2 | 11/2004 | McGuire |
| 6,816,905 B1 | 11/2004 | Sheets et al. |
| 6,850,253 B1 | 2/2005 | Bazerman et al. |
| 6,910,148 B1 | 6/2005 | Ho et al. |
| 6,922,685 B2 | 7/2005 | Greene et al. |
| 6,934,745 B2 | 8/2005 | Krautkremer |
| 6,952,728 B1 | 10/2005 | Alles et al. |
| 6,982,953 B1 | 1/2006 | Swales |
| 6,983,317 B1 | 1/2006 | Bishop et al. |
| 6,990,517 B1 | 1/2006 | Bevan et al. |
| 7,024,450 B1 | 4/2006 | Deo et al. |
| 7,055,063 B2 | 5/2006 | Leymann et al. |
| 7,069,344 B2 | 6/2006 | Carolan et al. |
| 7,082,463 B1 | 7/2006 | Bradley et al. |
| 7,082,464 B2 | 7/2006 | Hasan et al. |
| 7,085,277 B1 | 8/2006 | Proulx et al. |
| 7,085,827 B2 | 8/2006 | Ishizaki et al. |
| 7,093,280 B2 | 8/2006 | Ke et al. |
| 7,099,912 B2 | 8/2006 | Ishizaki et al. |
| 7,103,647 B2 | 9/2006 | Aziz |
| 7,120,693 B2 | 10/2006 | Chang et al. |
| 7,124,289 B1 | 10/2006 | Suorsa |
| 7,130,304 B1 | 10/2006 | Aggarwal |
| 7,131,123 B2 | 10/2006 | Suorsa et al. |
| 7,139,263 B2 | 11/2006 | Miller et al. |
| 7,151,775 B1 | 12/2006 | Renwick et al. |
| 7,152,109 B2 | 12/2006 | Suorsa et al. |
| 7,161,946 B1 | 1/2007 | Jha |
| 7,184,437 B1 | 2/2007 | Cole et al. |
| 7,200,662 B2 | 4/2007 | Hasan et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,305,492 B2 | 12/2007 | Bryers et al. |
| 7,310,314 B1 | 12/2007 | Katz et al. |
| 7,310,666 B2 | 12/2007 | Benfield et al. |
| 7,313,611 B1 | 12/2007 | Jacobs et al. |
| 7,336,615 B1 * | 2/2008 | Pan ............... H04L 12/2697 370/225 |
| 7,359,377 B1 | 4/2008 | Kompella et al. |
| 7,362,700 B2 | 4/2008 | Frick et al. |
| 7,363,353 B2 | 4/2008 | Ganesan et al. |
| 7,379,987 B2 | 5/2008 | Ishizaki et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,463,591 B1 * | 12/2008 | Kompella ............ H04L 12/2697 370/225 |
| 7,471,638 B2 | 12/2008 | Torrey et al. |
| 7,487,232 B1 | 2/2009 | Matthews et al. |
| 7,499,395 B2 * | 3/2009 | Rahman ............... H04L 12/2697 370/229 |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,539,769 B2 | 5/2009 | McGuire |
| 7,561,527 B1 | 7/2009 | Katz et al. |
| 7,606,898 B1 | 10/2009 | Hunt et al. |
| 7,609,637 B2 | 10/2009 | Doshi et al. |
| 7,639,624 B2 | 12/2009 | McGee et al. |
| 7,720,047 B1 | 5/2010 | Katz et al. |
| 7,720,061 B1 | 5/2010 | Krishnaswamy et al. |
| 7,724,677 B2 | 5/2010 | Iwami |
| 7,738,367 B1 | 6/2010 | Aggarwal et al. |
| 7,760,652 B2 * | 7/2010 | Tsillas ............... H04L 45/02 370/216 |
| 7,764,599 B2 * | 7/2010 | Doi ............... H04L 45/00 370/216 |
| 7,765,306 B2 | 7/2010 | Filsfils et al. |
| 7,765,328 B2 | 7/2010 | Bryers et al. |
| 7,813,267 B2 * | 10/2010 | Tsai ............... H04L 45/28 370/216 |
| 7,852,778 B1 | 12/2010 | Kompella |
| 7,860,981 B1 | 12/2010 | Vinokour et al. |
| 7,911,938 B2 * | 3/2011 | Florit ............... H04L 12/437 370/216 |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,019,835 B2 | 9/2011 | Suorsa et al. |
| 8,077,726 B1 | 12/2011 | Kumar et al. |
| 8,254,271 B1 | 8/2012 | Nadeau et al. |
| 8,266,264 B2 | 9/2012 | Hasan et al. |
| 8,339,959 B1 | 12/2012 | Moisand et al. |
| 8,370,528 B2 | 2/2013 | Bryers et al. |
| 8,488,444 B2 | 7/2013 | Filsfils et al. |
| 8,503,293 B2 | 8/2013 | Raszuk |
| 8,543,718 B2 | 9/2013 | Rahman |
| 8,693,398 B1 | 4/2014 | Chaganti et al. |
| 8,797,886 B1 | 8/2014 | Kompella |
| 8,902,780 B1 | 12/2014 | Hegde et al. |
| 8,948,001 B2 * | 2/2015 | Guichard ............... H04L 45/22 370/218 |
| 8,953,460 B1 * | 2/2015 | Addepalli ............... H04L 43/10 370/241 |
| 9,258,234 B1 | 2/2016 | Addepalli et al. |
| 9,407,526 B1 | 8/2016 | Addepalli et al. |
| 9,455,894 B1 * | 9/2016 | Neelam ............... H04L 43/10 |
| 2001/0042190 A1 | 11/2001 | Tremblay et al. |
| 2002/0007443 A1 | 1/2002 | Gharachorloo et al. |
| 2002/0032725 A1 | 3/2002 | Araujo et al. |
| 2002/0038339 A1 | 3/2002 | Xu |
| 2002/0093954 A1 | 7/2002 | Weil et al. |
| 2002/0105972 A1 | 8/2002 | Richter et al. |
| 2002/0120488 A1 | 8/2002 | Bril et al. |
| 2002/0141343 A1 | 10/2002 | Bays |
| 2002/0158900 A1 | 10/2002 | Hsieh et al. |
| 2002/0165727 A1 | 11/2002 | Greene et al. |
| 2002/0169975 A1 | 11/2002 | Good |

(56) References Cited

U.S. PATENT DOCUMENTS

| | | | |
|---|---|---|---|
| 2002/0191014 A1 | 12/2002 | Hsieh et al. |
| 2002/0194497 A1 | 12/2002 | McGuire |
| 2002/0194584 A1 | 12/2002 | Suorsa et al. |
| 2003/0005090 A1 | 1/2003 | Sullivan et al. |
| 2003/0009552 A1 | 1/2003 | Benfield et al. |
| 2003/0055933 A1 | 3/2003 | Ishizaki et al. |
| 2003/0097428 A1 | 5/2003 | Afkhami et al. |
| 2003/0112749 A1 | 6/2003 | Hassink et al. |
| 2003/0123457 A1 | 7/2003 | Koppol |
| 2003/0149746 A1 | 8/2003 | Baldwin et al. |
| 2004/0024869 A1 | 2/2004 | Davies |
| 2004/0116070 A1 | 6/2004 | Fishman et al. |
| 2005/0013310 A1 | 1/2005 | Banker et al. |
| 2005/0021713 A1 | 1/2005 | Dugan et al. |
| 2005/0063458 A1 | 3/2005 | Miyake et al. |
| 2005/0083936 A1 | 4/2005 | Ma |
| 2005/0175017 A1 | 8/2005 | Christensen et al. |
| 2005/0195741 A1 | 9/2005 | Doshi et al. |
| 2005/0259571 A1 | 11/2005 | Battou |
| 2005/0259634 A1 | 11/2005 | Ross |
| 2005/0281192 A1 | 12/2005 | Nadeau et al. |
| 2006/0018266 A1 | 1/2006 | Seo |
| 2006/0095538 A1 | 5/2006 | Rehman et al. |
| 2006/0133300 A1 | 6/2006 | Lee et al. |
| 2006/0233107 A1 | 10/2006 | Croak et al. |
| 2006/0239201 A1 | 10/2006 | Metzger et al. |
| 2006/0262772 A1 | 11/2006 | Guichard et al. |
| 2006/0285500 A1 | 12/2006 | Booth et al. |
| 2007/0014231 A1 | 1/2007 | Sivakumar et al. |
| 2007/0021132 A1 | 1/2007 | Jin et al. |
| 2007/0041554 A1 | 2/2007 | Newman et al. |
| 2007/0061103 A1 | 3/2007 | Patzschke et al. |
| 2007/0147281 A1 | 6/2007 | Dale et al. |
| 2007/0165515 A1 | 7/2007 | Vasseur |
| 2007/0180104 A1 | 8/2007 | Filsfils et al. |
| 2007/0180105 A1 | 8/2007 | Filsfils et al. |
| 2007/0207591 A1 | 9/2007 | Rahman et al. |
| 2007/0220252 A1 | 9/2007 | Sinko |
| 2007/0263836 A1 | 11/2007 | Huang |
| 2007/0280102 A1 | 12/2007 | Vasseur et al. |
| 2008/0004782 A1 | 1/2008 | Kobayashi et al. |
| 2008/0034120 A1 | 2/2008 | Oyadomari et al. |
| 2008/0049622 A1 | 2/2008 | Previdi et al. |
| 2008/0074997 A1 | 3/2008 | Bryant et al. |
| 2008/0163291 A1 | 7/2008 | Fishman et al. |
| 2008/0225731 A1 | 9/2008 | Mori et al. |
| 2008/0247324 A1 | 10/2008 | Nadeau et al. |
| 2008/0253295 A1 | 10/2008 | Yumoto et al. |
| 2009/0016213 A1 | 1/2009 | Lichtwald |
| 2009/0019141 A1 | 1/2009 | Bush et al. |
| 2009/0046579 A1 | 2/2009 | Lu et al. |
| 2009/0046723 A1 | 2/2009 | Rahman et al. |
| 2009/0201799 A1 | 8/2009 | Lundstrom et al. |
| 2009/0225650 A1 | 9/2009 | Vasseur |
| 2009/0232029 A1 | 9/2009 | Abu-Hamdeh et al. |
| 2009/0279440 A1 | 11/2009 | Wong et al. |
| 2010/0299319 A1 | 11/2010 | Parson et al. |
| 2011/0019550 A1 | 1/2011 | Bryers et al. |
| 2011/0063973 A1 | 3/2011 | VenkataRaman et al. |
| 2011/0170408 A1 | 7/2011 | Furbeck et al. |
| 2013/0028099 A1 | 1/2013 | Birajdar et al. |
| 2013/0185767 A1 | 7/2013 | Tirupachur Comerica et al. |
| 2014/0149819 A1* | 5/2014 | Lu .................. H04L 45/021 714/748 |

FOREIGN PATENT DOCUMENTS

| | | |
|---|---|---|
| EP | 1864449 A2 | 12/2007 |
| EP | 1891526 B1 | 2/2008 |
| WO | 2006104604 A2 | 10/2006 |

OTHER PUBLICATIONS

"Configure an Unnumbered Interface," www.juniper.net/techpubs/software/junos/junos56/index.html, last printed Nov. 7, 2005, 1 p.

"Configure the loopback Interface," www.juniper.net/techpubs/software/junos/junos56/index.html, Last printed Nov. 7, 2005, 2 pp.

"ICMP (Internet Control Message Protocol)," Data Network Resource, www.rhyshaden.com/icmp.html, last printed Nov. 10, 2005, 4 pp.

"RFC 2151—(rfc2151)—A primer on Internet and TCP/IP Tools and Utilities," www.rfcsearch.org/rfcview/RFC/2151.html, last printed Nov. 9, 2005, 3 pp.

"Traceroute," Webopedia, www.webopedia.com/TERM/t/traceroute.heml, Aug. 26, 2004, 1 p.

"Using the IP unnumbered configuration FAQ," APNIC, www.apnic.net/info/faq/ip_unnumb.html, Jul. 1, 2005, 2 pp.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Aggarwal, "OAM Mechanisms in MPLS Layer 2 Transport Networks," IEEE Communications Magazine, Oct. 2004, pp. 124-130.

Atlas, "ICMP Extensions for Unnumbered Interfaces," draft-atlas-icmp-unnumbered -00, Dec. 9, 2005, 8 pp.

Atlas, ICMP Extensions for Unnumbered Interfaces, draft-atlas-icmp-unnumbered-01, Feb. 2006 8 pp.

Berkowitz, "Router Renumbering Guide," Network Working Group, RFC 2072, Jan. 1997, 41 pp.

Bonica et al., "Generic Tunnel Tracing Protocol (GTTP) Specification," draft-bonica- tunproto-01.txt, IETF Standard-Working-Draft, Internet Engineering Task Force, Jul. 2001, 20 pp.

Chen et al., "Dynamic Capability for BGP—4," Network Working Group, Internet Draft, draft-ietf-idr-dynamic-cap-03.txt, Dec. 2002, 6 pp.

Gorry Fairhurst, "Internet Control Message protocol," Internet Control Protocol, (ICMP), www.erg.abdn.ac.uk/users/gorry/course/inet-pages/icmp.html, last printed Sep. 6, 2006, 3 pp.

Hegde et al., Multipoint BFD for MPLS, Network Working Group, Internet-Draft, draft- chandra-hedge-mpoint-bfd-for-mpls-00.txt, Mar. 2012, 12 pp.

Katz et al. "Bidirectional Forwarding Detection (BFD) for Multihop Paths" Internet Engineering Task Force (IETF), RFC 5883, Jun. 2010, 6 pgs.

Katz et al., "Bidirectional Forwarding Detection," draft-ietf-bfd-base-06.txt, Network Working Group, Internet Draft, Mar. 2007, 49 pp.

Katz et al., "Bidirectional Forwarding Detection (BFD)," Internet Engineering Task Force (IETF), RFC 5880, Juniper Networks, Jun. 2010, 50 pp.

Katz et al., "Generic Application of Bidirectional Forwarding Detection (BFD)," Internet Engineering Task Force (IETF), RFC 5882, Juniper Networks, Jun. 2010, 15 pp.

Katz et al., "BFD for Multipoint Networks," Network Working Group, Internet Draft, draft- ietf-bfd-multipoint-00.txt, Oct. 2011, 29 pp.

Kolon, "BFD spots router forwarding failures," Network World, www.networkworld.com/news/tech/2005/030705techupdate.html, Mar. 7, 2005, 3 pp.

Kompella et al., "Detecting Multi-Protocol Label Switched (MPLS) Data Plane Failures," Network Working Group, RFC 4379, Cisco Systems, Inc., Feb. 2006, 50 pp.

Kompella et al., Signalling Unnumbered Links in Resource ReSerVation Protocol—Traffic Engineering (RSVP-TE), Network Working Group, RFC 3477, Jan. 2003, 8 pp.

Mannie, "Generalized Multi-Protocol Label Switching Architecture," Network Working Group, Internet draft, draft-ietf-ccamp-gmpls-architecture-07.txt, May 2003, 56 pp.

Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.

Sangli et al., "Graceful Restart Mechanism for BGP," Network Working Group, Internet Draft, draft-ietf-idr-restart-06.txt, http://toolsietf.ort/html/draft-ietf-idr-restart-06, Jan. 2003, 10 pp.

Saxena et al., Detecting Data-Plane Failures in Point-to-Multipoint Mpls—Extensions to LSP Ping, Internet Engineering Task Force (IETF) RFC 6425, Nov. 2011, 28 pp.

(56) References Cited

OTHER PUBLICATIONS

Sun Hai-feng, "Advanced TCP Port Scan and it's Response," O.L. Automation 2005, vol. 24, No. 4, China Academic Electronic Publishing House, http://www.cnki.net, Apr. 24, 2005, 2 pp. (Abstract only).

Vijay Mukhi et al., "Internet Control Message Protocol ICMP," www.vijaymukhi.com/vmis/icmp, last printed Sep. 6, 2006, 5pp.

Zvon, RFC 2072, [Router Renumbering Guide] —Router Identifiers, Chapter 8.3, Unnumbered Interfaces, www.zvon.org/tmRFC/RFC2072/output/chapter8.html, last printed on Nov. 7, 2005, 2 pp.

Katz et al., "Bidirectional Forwarding Detection (BFD) for IPv4 and IPv6 (Single Hop)," Internet Engineering Task Force (IETF), RFC 5881, Juniper Networks, Jun. 2010, 7 pp.

U.S. Appl. No. 61/054,692, filed May 20, 2008 entitled Streamlined Packet Forwarding Using Dynamic Filters for Routing and Security in a Shared Forwarding Plane.

U.S. Appl. No. 13/730,737, filed Dec. 28, 2012 entitled Dynamically Adjusting Liveliness Detection Intervals for Periodic Network Communications.

U.S. Appl. No. 13/731,993, filed Dec. 31, 2012 entitled Network Liveliness Detection Using Session-External Communications.

U.S. Appl. No. 14/039,412, filed Sep. 27, 2013 entitled Selective Fast Re-Route Using Forwarding Plane Liveliness Detection Protocols.

"DARPA Internet Program Protocol Specification," Transmission Control Protocol, RFC 793, Sep. 1981, 90 pp.

Boney, "Cisco IOS in a Nutshell," 2nd Edition, published Aug. 2005, 16 pp.

H3C S3610 & S5510 Series Ethernet Switches (Version: 20081229-C-1.01, Release 5303, 2006-2008, Command Manual- BFD-GR), 2008, 13 pp.

Harmon "32-Bit Bus Master Ethernet Interface for the 68030 (Using the Macintosh SE/30)," Apr. 1993, 10 pp.

U.S. Appl. No. 15/018,669, filed by Meher Aditya Kumar Addepalli et al, filed on Feb. 8, 2016.

Muller, "Managing Service Level Agreements," International Journal of Network Management, John Wiley & Sons, Ltd., May 1999, vol. 9, Issue 3, pp. 155-166.

Nichols, et al., "Definition of the Differentiated Services Field (DS Field) in the IPv4 and IPv6 Headers," Network Working Group, RFC 2474, Dec. 1998, 20 pp.

Papavassilion, "Network and service management for wide-area electronic commerce networks," International Journal of Network Management, John Wiley & Sons, Ltd., Mar. 2001, vol. 11, Issue 2, pp. 75-90.

Ramakrishnan, et al. "The Addition of Explicit Congestion Notification (ECN) to IP", RFC 3168, Sep. 2001, 63 pp.

Schmidt, "A Family of Design Patterns for Flexibly Configuring Network Services in Distributed Systems," Proceedings of the Third International Conference on Configurable Distributed Systems, May 6-8, 1996, IEEE Press, pp. 124-135.

Troutman, "DP83916EB-AT: High Performance AT Compatible Bus Master Ethernet Adapter Card," Nov. 1992, 34 pp.

* cited by examiner

| VERSION 140A | DIAGNOSTIC 140B | STATE 140C | MODES 140D | DETECTION TIMER MULTIPLIER 140E | LENGTH 140F |
|---|---|---|---|---|---|
| 0  2 | 3  7 | 8  9 | 10  15 | 16  23 | 24  32 |
| MY DESCRIMINATOR 140G ||||||
| YOUR DESCRIMINATOR 140H ||||||
| DESIRED MINIMUM TRANSFER INTERVAL 140I ||||||
| REQUIRED MINIMUM RECEIVE INTERVAL 140J ||||||
| REQUIRED MINIMUM ECHO RECEIVE INTERVAL 140K ||||||

IMPENDING CONTROL PLANE DISRUPTION INDICATION USING FORWARDING PLANE LIVELINESS DETECTION PROTOCOLS

TECHNICAL FIELD

This disclosure relates generally to computer networks, and more specifically, to mitigating control plane disruptions within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes available routes through the network. Each route defines a path between two locations on the network. In order to maintain an accurate representation of a network, each router typically executes one or more routing protocols in a "control plane" of the device. In general, the "control plane" of a router refers to dedicated hardware or other resources that provide the intelligence to communicate with other peer routers to learn the topology of a network including available routes through the network. By execution of the routing protocols, the control planes of routers maintain control-plane communication sessions through which the protocols exchange routing information that reflects the current topology of the network.

Based on the topology, the control plane of a router makes path selection and programs or otherwise configures a "data plane" or "forwarding plane" of the router, which refers to the dedicated hardware or other resources that is responsible for processing the packets traversing the network. Upon receiving an incoming packet, for example, the forwarding plane of the router examines information within the packet and forwards the packet in accordance with forwarding information installed within the forwarding plane by the control plane of the router.

SUMMARY

In general, techniques are described for providing an indication of an impending control plane disruption using an enhanced forwarding plane liveliness detection protocol. For example, techniques are described in which a protocol used for monitoring operational status of a forwarding plane of a router or other network device is enhanced to carry additional information that provides an indicator of an impending disruption in the control plane of the network device.

In one example, liveliness detection messages sent by a router in accordance with the forwarding plane liveliness detection protocol may provide an indication that the forwarding plane of a router is operation and able to forward packets. The liveliness detection messages may be enhanced to include additional information to provide an indication of impending disruption in the control plane of the network device. In some cases, the liveliness detection messages may be sent with periodically by the forwarding plane detection protocol with short periodicity (e.g., on the order of a few tens of milliseconds). In other examples, the liveliness detection messages may be sent on demand by the forwarding plane, i.e., when needed or in response to an event or received communication. In either case, by leveraging liveliness detection messages between forwarding planes, peer routers or other devices, such as network controllers, may thus be quickly informed of an impending loss of operation of the control plane of the router. In response, peer routers may adjust their own control plane operation so as to prevent various control plane protocols triggering traffic re-route or other recovery processes upon detecting unreachability of the router. That is, the peer router may suppress, at least temporarily a control-plane recovery or re-convergence process that would otherwise be triggered upon loss of control-plane communication with the router. In some examples, the additional information embedded within the messages of the forwarding plane liveliness detection protocol may further include an optional field specifying an expected duration for the impending control plane disruption. Moreover, in some examples, a subsequent forwarding plane message may be used to affirmatively indicate an end to the control plane disruption period.

Although described herein with reference to the liveliness detection protocols, the techniques may be applied with other protocols (e.g., layer two or layer three protocols) that execute in the forwarding plane or are otherwise delegated to the forwarding plane and that utilize period/on-demand messages with peer devices to indicate forwarding plane connectivity. Examples of such protocols include Address Resolution Protocol (ARP), the Neighbor Discover (ND) Protocol.

In one example, a method comprises executing, within a control plane of a network device, one or more routing protocols to exchange network topology information with one or more other network devices and to program a packet forwarding component of the network device to forward packets in accordance with the network topology information. The method further comprises detecting, with the packet forwarding component, an impending disruption to operation of the control plane of the network device and constructing, with the packet forwarding component, a liveliness detection message in accordance with a forwarding-plane liveliness detection protocol. The message comprises an indication of the impending disruption to operation of the control plane. The method includes outputting, by the packet forwarding component, the liveliness detection message to a peer network device in accordance with the forwarding plane liveliness detection protocol.

In another example, a network device comprises a routing component having a hardware-based processor to execute one or more control plane protocols and exchange network topology information with a peer network device. The network device further comprises a packet forwarding component of the network device programmed by the routing component to forward packets in accordance with the network topology information. The packet forwarding component exchanges liveliness detection messages with packet forwarding components of the peer network device in accordance with a forwarding-plane liveliness detection protocol. Responsive to an impending disruption to operation of the routing component of the network device, the packet forwarding component constructs one of the liveliness detection messages to include an indication of the impending disruption to operation of the routing component and outputs the liveliness detection message to the peer network device in accordance with the forwarding plane liveliness detection protocol.

In another example, a network device comprises a routing component having a hardware-based processor that provides a control plane for execution of one or more protocols. A packet forwarding component of the network device is programmed by the routing component to forward packets in accordance with the network topology information. The packet forwarding component executes a forwarding-plane liveliness detection protocol to receive liveliness detection messages from a peer network device, a first one of the messages comprising an indication of an impending disruption to operation of the routing component. The routing component, in response to receipt of the first one of the liveliness detection message by the packet forwarding component, suppresses a recovery action otherwise triggered by a loss of communication with a control plane of the peer network device.

The details of one or more examples are set forth in the accompanying drawings and the description below. Other features, objects, and advantages of this disclosure will be apparent from the description and drawings, and from the claims.

BRIEF DESCRIPTION OF DRAWINGS

FIG. 4 is a diagram illustrating an exemplary BFD control message enhanced to carry additional information as to a status of an internal communication between a forwarding plane and a control plane of a router.

DETAILED DESCRIPTION

Figure 1:
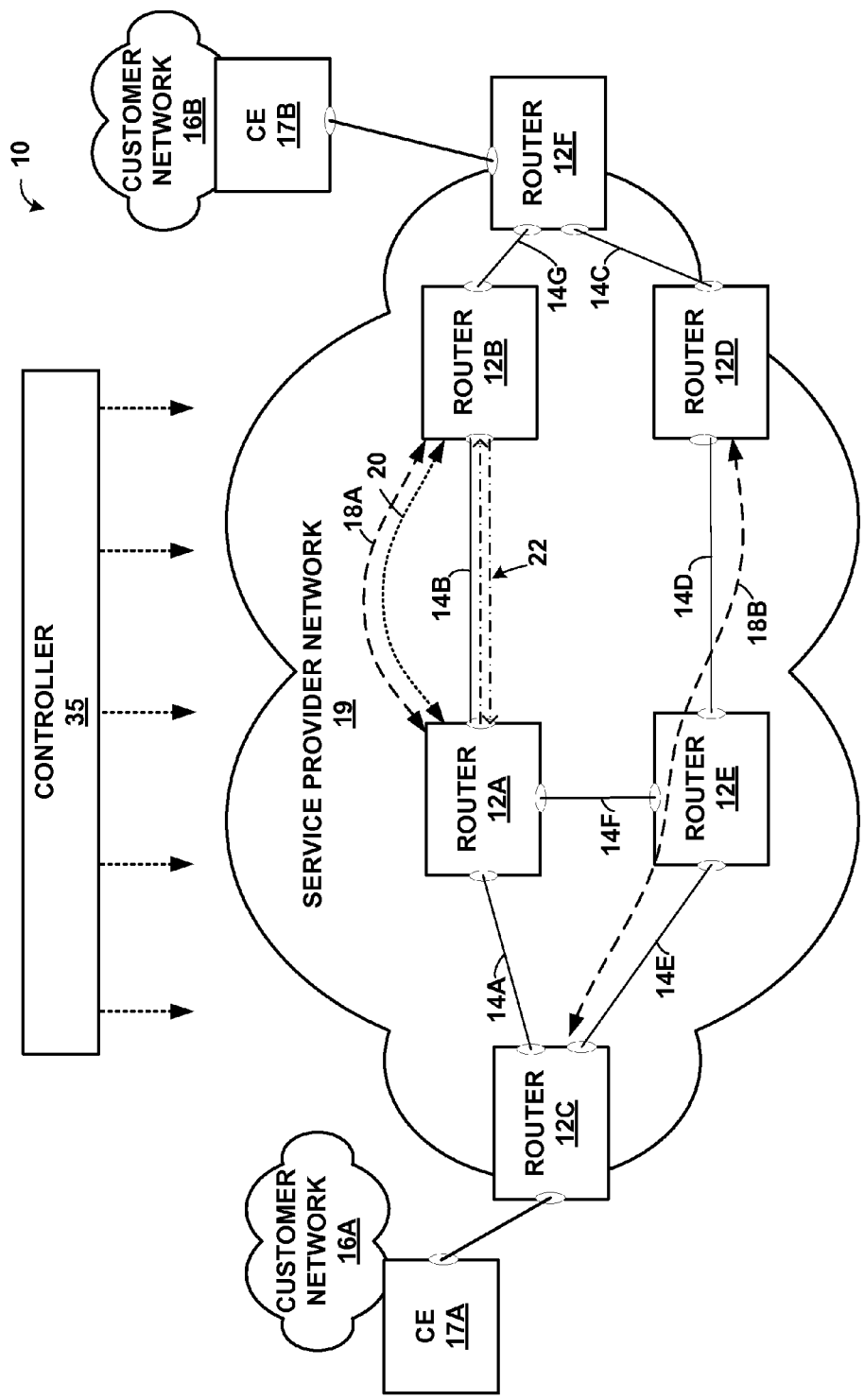
FIG. 1 is a block diagram illustrating an example network system in which techniques described herein may be implemented.

FIG. 1 is a block diagram illustrating an example network system 10 in which the techniques described herein may be implemented. In this example, network system 10 includes service provider network 19, which is communicatively coupled to customer networks 16A and 16B ("customer networks 16"). In turn, service provider network 19 includes routers 12A-12F ("routers 12"), which operate and interact with one another in accordance with the techniques described herein. Routers 12 are communicatively coupled to one another, either directly, or indirectly, via physical links 14A-14G ("links 14"). Links 14 represent any physical medium, such as a copper wire, a coaxial cable, any of a host of different fiber optic lines, a wireless connection, and various combinations thereof. In the specific example of FIG. 1, routers 12C and 12F represent edge routers. More specifically, routers 12C and 12F provide an interface between service provider network 19 and respective customer networks 16.

Additionally, customer networks 16 include respective customer edge routers 17A and 17B ("CE routers 17"). As shown, each of CE routers 17 is linked to a respective edge router of routers 12. Edge routers 12C and 12F communicate with CE routers 17 to provide customer networks 16 with access to service provider network 19. As shown, each of customer networks 16 may be a network for a site of an enterprise. Each of customer networks 16 may include one or more computing devices (not shown), such as personal computers, laptop computers, handheld computers, workstations, servers, switches, printers, or other devices. Service provider network 19 may be coupled to one or more networks administered by other service providers, and may thus form part of a large-scale public network infrastructure, e.g., the Internet. Consequently, customer networks 16 may be viewed as edge networks of the Internet.

The service provider may provide computing devices within customer networks 16 with access to the Internet via service provider network 19, which allows computing devices within one of customer networks 16 to communicate with computing devices within the Internet or the other one of customer networks 16. FIG. 1 may be a simplified view of network system 10. For instance, service provider network 19 can include a variety of other network devices (not shown), such as routers, switches, servers, and the like and may be connected to other networks. In contrast to edge routers 12C and 12F, the remainder of routers 12 represents intermediate routers. More specifically, intermediate routers 12A, 12B, 12D, and 12E provide various communication channels between edge routers 12C and 12F.

Routers 12 execute control-plane routing protocols to maintain accurate representation of the topology of service provider network 19. For example, routing components within routers 12 maintain peering sessions with each other and exchange routing information for routes or links within service provider network 19 in accordance with one or more routing protocols. In the example of FIG. 1, routers 12A, 12B are shown as maintaining a control-plane communication session 18A for exchanging routing information, such as topology information and available routes through service provider network 19. Similarly, routers 12C, 12D are shown as maintaining a control-plane communication session 18B for exchanging routing information. Although only shown by way of example with respect to routers 12A, 12B and 12C, 12D, other combinations of routers 12, 17 typically maintain control-plane communication sessions for exchanging routing information using various routing protocols. Example protocols include the Border Gateway Protocol (BGP) distance vector routing protocol and the Open Shortest Path First (OSPF) and Intermediate System-to-Intermediate System (IS-IS) link state routing protocols.

In addition to routing protocols, the control planes of routers 12 typically execute a variety of other so called "control plane" protocols, such as the Address Resolution Protocol (ARP), the Neighbor Discover (ND) Protocol, various Operations, Administration, and Maintenance (OAM) protocols and the like.

In the example of FIG. 1, service provider network 19 may also include a centralized controller 35 that provides complete control-plane functionality for the service provider network. As described herein, controller 35 may provide seamless end-to-end path selection and routing control over routers 12 through service provider network 19. That is, controller 35 may include a sophisticated control plane that interacts with control planes of routers 12 for ultimately programming and controlling data planes of the routers.

In association with the control plane communication sessions for conveying network topology information, routers 12 and controller 35 may periodically send status inquiries (e.g., send "periodic packets" or "periodic data") to one another in order to provide and continue to prove/verify the control plane communication between the peer routers. That is, by sending periodic packets and detecting receipt of similar periodic packets, routers 12 and controller 35 detect any failures in control plane communications between the peer routers, either as a result of failure of an internal routing component or a given control-plane protocol of one or more of routers 12. In this example of FIG. 1, control plane components of routers 12A, 12B are shown as exchanging periodic packets 20 for continuing to verify control plane communications between the routers. Although not shown, other routers 12 and controller 35 typically exchange periodic packets between respective control plane components (e.g., routing components) in accordance with control plane protocols for verifying control plane connectivity between the routers.

Each router typically maintains a relatively long timeout value in association with the monitoring of control plane connectivity, such as three to twenty seconds or more as examples. Upon detecting loss of control plane communication, the detecting router 12 may elect to update one or more internal representations of the topology of service provider network 19, and outputs session messages to the other routers 12 to inform the other routers 12 of the topology changes. For example, upon detecting loss of control plane communication with router 12B by way of periodic packets 20, router 12A may elect to update its routing information so as to direct packets destined for customer network 16B to router 12E, thereby routing around router 12B.

In some cases, router 12B may support various features such as "non-stop forwarding" and "graceful restart." For example, packet forwarding components (e.g., hardware-based packet forwarding engines) of router 12B may support "non-stop forwarding" and, therefore, is capable of continuing to forward packets even though the control plane of router 12B may no longer be operational. This allows the packet forwarding components of router 12B to forward packets in accordance with its last know state as to the topology of service provider network 12. As such, even though the control plane of router 12B may be out of communication, the forwarding plane of router 12B continues operation in uninterrupted fashion. Moreover, the control plane of router 12B may support "graceful restart," which refers to the capability of preserving the forwarding information while restarting a routing communication session, e.g., a BGP session, in the control plane. In other words, even though router 12B may have lost control plane communication via session 20, router 12B may be able to continue to forward packets and may, upon restoring control plane functionality, may be able to restart certain control plane routing protocols without substantially disrupting routing services. As such, by way of periodic packets 20, router 12A may detect loss of control plane communication with router 12B but typically only after a significant period of time (e.g., after reaching a threshold timeout value of 3-20 seconds or more). In response, router 12A may direct traffic around 12B or may elect to defer redirection when router 12B supports features such as non-stop forwarding and graceful restart; however, in either case the forwarding plane of router 12B may have been utilizing state forwarding information for some time prior to detection of the loss of control plane communication between the routers.

In addition to utilizing protocols and corresponding periodic packets for monitoring an ability to communicate directly between control plane components, routers 12 may separately execute data plane protocols to monitor operation of the underlying packet forwarding components (also referred to as packet forwarding engines or a "forwarding plane") to confirm that the forwarding components of the routers are currently able to forward packets. In the example of FIG. 1, routers 12A and 12B exchange data-plane related liveliness detection messages 22 to detect the liveliness of the forwarding plane of each other, and the routers may exchange liveliness detection messages 22 for detecting forwarding plane liveliness on-demand or at a periodic rate that is significantly faster (e.g., every 10-50 ms) than the rate at which the routers exchange packets 20 (e.g., 3-20 seconds) for monitoring control plane communication capability between the routers. Protocols for monitoring the operation of packet forwarding components may generally be referred to as forwarding plane liveliness detection protocols. Although described herein with reference to the liveliness detection protocols, the techniques may be applied with other protocols (e.g., layer two or layer three protocols) that execute in the forwarding plane or are otherwise delegated to the forwarding plane and that utilize period/on-demand messages with peer devices to indicate forwarding plane connectivity. Examples of such protocols include Address Resolution Protocol (ARP), the Neighbor Discover (ND) Protocol.

When a forwarding plane message 22 associated with a forwarding plane liveliness detection protocol is not received in the allotted time frame, a packet forwarding component of the router expecting receipt of the periodic packet determines that a network event has occurred causing the forwarding plane of the peer router to be unable to process packets. In such case, the router may elect to immediately reroute traffic around the peer router since the peer router is no longer forwarding packets. For example, router 12A may, upon detecting failure lack of responsiveness from the forwarding plane of router 12B via liveliness detection messages 22, immediately reroute traffic around router 12B since the forwarding plane of router 12B appears to no longer be forwarding packets. One exemplary forwarding plane liveliness detection protocol is the bidirectional forwarding detection (BFD) protocol. The BFD protocol provides a very short interval of time between which the forwarding plane of routers 12 must transmit periodic messages, and thus may facilitate a fast detection of failures by packet forwarding engines for any of routers 12 that are in active BFD sessions. Further details of the BFD protocol may be found in the proposed standard for BFD, by D. Katz and D. Ward (Juniper Networks, June 2010, ISSN: 2070-1721), the entire content of which is incorporated herein by reference.

In general, techniques are described for preemptively providing an indication of an impending control plane disruption using forwarding plane liveliness detection protocols. For example, techniques are described in which a data plane protocol used for monitoring operational status of a forwarding plane of a router or other network device is enhanced to carry additional information that provides an indicator of an impending disruption in the control plane of the network device. With respect to the example of FIG. 1, liveliness detection messages 22 output by router 12B not only provide an indication to router 12A of the operational status of the forwarding plane of router 12B but have been enhanced to carry additional information to indicate any impending control plane disruption of the routing components of router 12B. For example, receipt of liveliness detection messages 22 by router 12A in accordance with the forwarding plane liveliness detection protocol provides an indication that the forwarding plane of router 12B is operation and able to forward packets. In addition, any of liveliness detection messages 22 may include additional information to indicate an impending disruption of operation of the control plane of router 12B, thereby providing an indication that router 12A should expect an upcoming loss of communication with the control plane of router 12B.

In this way, peer router 12A or other devices, such as network controller 35, may thus be quickly informed of an impending loss of communication with the control plane of router 12B. As a result, peer router 12A may adjust its own control plane operation so as to prevent various control plane protocols from triggering traffic re-route or other recovery processes upon detecting unreachability of the control plane of router 12B. Further, the additional information embedded within liveliness detection messages 22 by the forwarding plane liveliness detection protocol of router 12B may include an optional field indicating an expected duration for the impending control plane disruption. In some examples, a subsequent packet 22 may be output by router 12B to affirmatively indicate an end to the control plane disruption period.

Leveraging a forwarding path liveliness detection protocol to convey in internal state of communications between the forwarding plane (e.g., a packet forwarding component) and a control plane (e.g., a routing component) of a router may provide certain advantages. For example, by providing such an indication, peer routers may, in response to liveliness detection messages 22 conveying an indication of an impending loss of control plane functionality and upon detecting an actual loss of communication with the control plane of the peer network device via periodic packets 20, suppresses reroute of one or more packet flows around peer router 12B. As another example, in response to receiving an indication of an impending loss of control plane functionality, peer network router 12A may suppress a recovery process of one or more control plane protocols upon detecting loss of communication with the control plane of the peer network device. For example, router 12A may execute ARP, OAM, ND or other control plane protocols, and router 12A may configure any of the protocols to at least temporary suspend triggering a recovery process in response to loss of control plane communication with router 12B.

Although described herein with reference to the BFD protocol as an example, the techniques may be applied with other protocols (e.g., layer two or layer three protocols) that execute in the forwarding plane or are otherwise delegated to the forwarding plane and that utilize period messages to indicate forwarding plane connectivity. Other example forwarding plane liveliness detection protocols that may be used could, for example, be OAM (Operations, Administration and Management) protocols that may be used to verify forwarding plane connectivity. Moreover, the techniques may be applied to instances where routers 12 employ the BFD protocol, for example, in conjunction with other control plane protocols, such as routing protocols like BGP, OSPF or IS-IS. In situations where multiple protocols are sharing one or more common BFD sessions, peer routers, and protocols executed by those protocols, can respond differently to an indication of an impending disruption to all or portions of the control plane. Furthermore, in the event no existing BDF sessions between certain pairs of routers 12, BFD sessions may be established between the routers using topology information learned by other protocols executing in the control plane, such as IGP, BGP or EGP routing protocols. Once established, the BFD sessions may execute in forwarding components of the routers to exchange enhanced periodic messages as described herein.

In one example, routers 12 negotiate timeout values during an initial discover process. For example, upon initial discovery using ND or an Interior Gateway Protocol (IGP), routers 12A and 12B exchange time duration values, such as maximum suppression durations, for one or more types of potential control plane disruptions. For each potential control plane disruptions, routers 12A and 12B may agree upon or otherwise be pre-configured with timeout value. Moreover, such timeouts may be specified with respect to the entire control plane or individual control plane protocols. For example, routers 12A and 12B may negotiate indicators (codes) for indicating an impending disruption of specific control plane features as well as respective durations for suppressing any recovery or re-convergence process by the control plane protocol. One example of such negotiated indicators and time duration values is as follow:

TABLE 1

| INDICATOR | SUPPRESSION DURATION | CONTROL PLANE DISRUPTION |
| --- | --- | --- |
| 1 | 30 seconds | Planned Graceful Restart |
| 2 | 30 seconds | Unplanned Graceful Restart |
| 3 | 120 seconds | Warm restart |
| 4 | 30 seconds | Planned ARP disruption |
| 5 | 30 seconds | Planned ND disruption |
| 6 | 30 seconds | Planned Routing Protocol (RPD) disruption |

In this way, peer routers may selectively suppress keep-alive requirements for specific control plane components. For example, in the event router 12B issues a packet 22 having an indication of an impending disruption to the ARP protocol in the control plane (indicator code 4), router 12A may reconfigure the ARP protocol in its control plane to suppress triggering a recovery process in the event the ARP protocol loses communication with the ARP protocol on router 12B. Moreover, other control plane components of router 12A remain unaffected. As a result, a routing protocol executing in the control plane of router 12A may still trigger a reroute of traffic in the event communication is lost with a routing protocol executing on router 12B.

Figure 2:
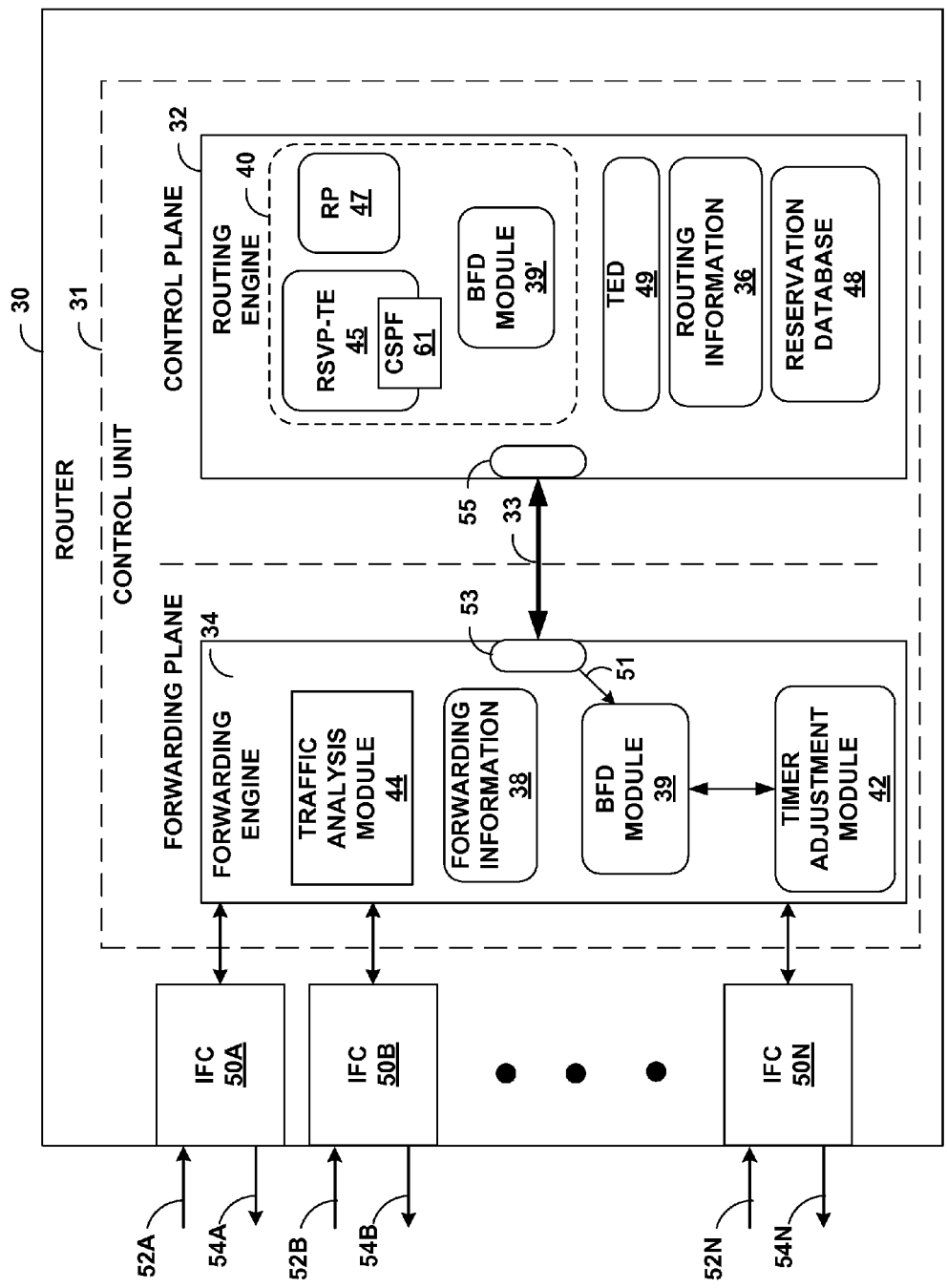
FIG. 2 is a block diagram illustrating an exemplary router in accordance with the disclosure herein.

FIG. 2 is a block diagram illustrating exemplary router 30 in accordance with the disclosure herein. Router 30 provides an example implementation of a router that may implement the techniques described herein. For example, router 30 may be of any of routers 12 illustrated in FIG. 1. While router 30 illustrates one possible router implementation to perform the techniques described herein, it will be appreciated that various other implementations are possible in accordance with this disclosure.

In this example, router 30 includes a control unit 31 that comprises a routing engine 32 that provide control plane functionality and a packet forwarding engine 34 that provides forwarding plane functionality. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing engine 32 primarily provides an operating environment for execution of control plane protocols, such as those included in protocols 40. For example, one or more routing protocols ("RP") 47 maintains routing information 36 to reflect the current topology of a network and other network entities to which it is connected. In particular, RP 47 may communicate with protocols executing in the control plane of other routers to exchange topology information or others state information for a computer network and, based on the exchanged communication, update routing information 36 to accurately reflect the topology of the network and other entities. Example routing protocols include Multi-Protocol Border Gateway Protocol (mpBGP), the Intermediate System to Intermediate System (ISIS) routing protocol, the Open Shortest Path First (OSPF) routing protocol and the like.

As shown in FIG. 2, routing engine 32 and forwarding engine 34 internally communicate within router 30 via communication link 33. As one example, internal communication link 33 may be a high-speed Ethernet-type network connection. In this example, each of forwarding engine 34 and routing engine 32 may incorporate network interface hardware and corresponding software providing a network stack so as to allow the components to communicate with each via one or more internal network communication sessions, such as Transmission Control Protocol (TCP) sessions.

Internal communication link 33 provides bi-directional communication between forwarding engine 34 and routing engine 32. For example, inbound control-plane communications conveying topology information from other peer routers are received on interface cards 50 and forwarded to the routing engine via internal communication link 33. In response, routing engine 32 processes the control plane packets to update routing information 36, generates forwarding information in the control plane and, by way of the internal communication link 33, programs the forwarding engine 34 with forwarding information 38 that associates network destinations with specific next hops and corresponding interface ports of IFCs 50 in accordance with routing information 36. Routing engine 32 may generate forwarding information 38 in the form of a radix tree having leaf nodes that represent destinations within the network. In this way, internal communication link 33 allows routing engine 32 of the control plane to update forwarding information 38 within the forwarding plane in response to control-plane messages received from peer routers, thereby preventing the forwarding information from becoming stale.

Based on forwarding information 38, forwarding engine 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution, the contents of which is incorporated herein by reference in its entirety.

In one example, forwarding engine 34 is a rich and dynamic shared forwarding plane, optionally distributed over a multi-chassis router. Moreover, forwarding plane 34 may be provided by dedicated forwarding integrated circuits normally associated with high-end routing components of a network router. Further details of one example embodiment of router 30 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

As shown in FIG. 2, protocols 40 executing within routing engine 32 include one or more MPLS protocols for engineering traffic flows to flow along particular paths. For example, RSVP-TE 45 may generate and maintain a traffic engineering database 49, including bandwidth reservations for paths associated with a network, such as service provider network 20 of FIG. 1. Constrained Shortest Path First (CSPF) process 61 computes a shortest path or paths for a communication session based on specified constraints and bandwidth availability information associated with the links within the network. RP 47 may, in turn, advertise the calculated bandwidth availability information in TED 49 to other peer routers. In response to topology changes, RSVP-TE 45 and/or RP 47 may elect to select different paths in accordance with updated routing information 36, generate updated forwarding information 38 and program the forwarding information into forwarding engine 34 by way of internal communication link 33.

Moreover, as shown in FIG. 2, forwarding engine 34 includes BFD module 39 that is enhanced in accordance with the techniques described herein. In some cases, BFD module 39 of forwarding engine 34 may be configured by BFD module 39' or similar logic (not shown) executing in the control plane. Moreover, BFD module 39 may execute on any of IFCs 50 that utilize BFD protocol-based techniques to exchange BFD packets with peer devices to monitor the liveliness of the forwarding plane. Although described herein with reference to BFD, the techniques may be applied with other protocols (e.g., layer two or layer three protocols) that execute in the forwarding plane or are otherwise delegated to the forwarding plane and that utilize period/on-demand messages with peer devices to indicate forwarding plane connectivity. Examples of such protocols include Address Resolution Protocol (ARP), the Neighbor Discover (ND) Protocol. In these examples, enhanced BFD module 39 executing in the forwarding plane may be replaced with an enhanced ARP or ND forwarding-plane module.

In general, BFD module 39 implements BFD protocol-based functionalities, such as transmitting and monitoring for periodic BFD packets in the data-plane, thereby conserving resources that would otherwise be expended by routing engine 32. In case of a detected connectivity failure, BFD module 39 may be configured to output a failure notification, or other similar indication. In some examples, forwarding engine 34 responds to the failure notification by triggering pre-programmed actions, such as rerouting traffic or initiating one or more timers. In other example, BFD module 39 outputs the failure indication to BFD module 39' or another component of routing engine 32. In response to receiving the failure notification from BFD module 39 of forwarding engine 34, BFD module 39' or another component of routing engine 32 causes RP 47 to update the network topology currently stored to routing information 36, to reflect the failed link(s) represented by the BFD failure.

In accordance with the techniques described herein, BFD module 39 has been enhanced to generate outbound BFD packets so as to include additional information that provides an indication an impending disruption of operation of the control plane (e.g., routing engine 32) of router 32. For example, as a forwarding-plane liveliness detection protocol, outbound packets generated by BFD module 39 may provide other routers an indication that the forwarding plane of router 32 is operational and able to forward packets In one example, BFD module 39 constructs the BFD packets to embed additional information based on a status signal 51 received from a component of routing engine 32 via internal communication interface 53. For example, a component of routing engine 32 may output a command informing forwarding engine 34 of an impending loss of internal communication, such as a planned or recently initiated software upgrade to routing engine 32. In any of these cases, BFD module 39 constructs and outputs BFD packets to include additional information that, although forwarding engine 34 may be able to continue to forward packets in accordance with forwarding information 38, operation of routing engine 32 may subsequently become disrupted.

The architecture of router 30 illustrated in FIG. 2 is shown for exemplary purposes only. In other embodiments, router 30 may be configured in a variety of ways. In one embodiment, for example, control unit 31 and its corresponding functionality may be distributed within IFCs 50. Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as computer memory or hard disk.

Figure 3:
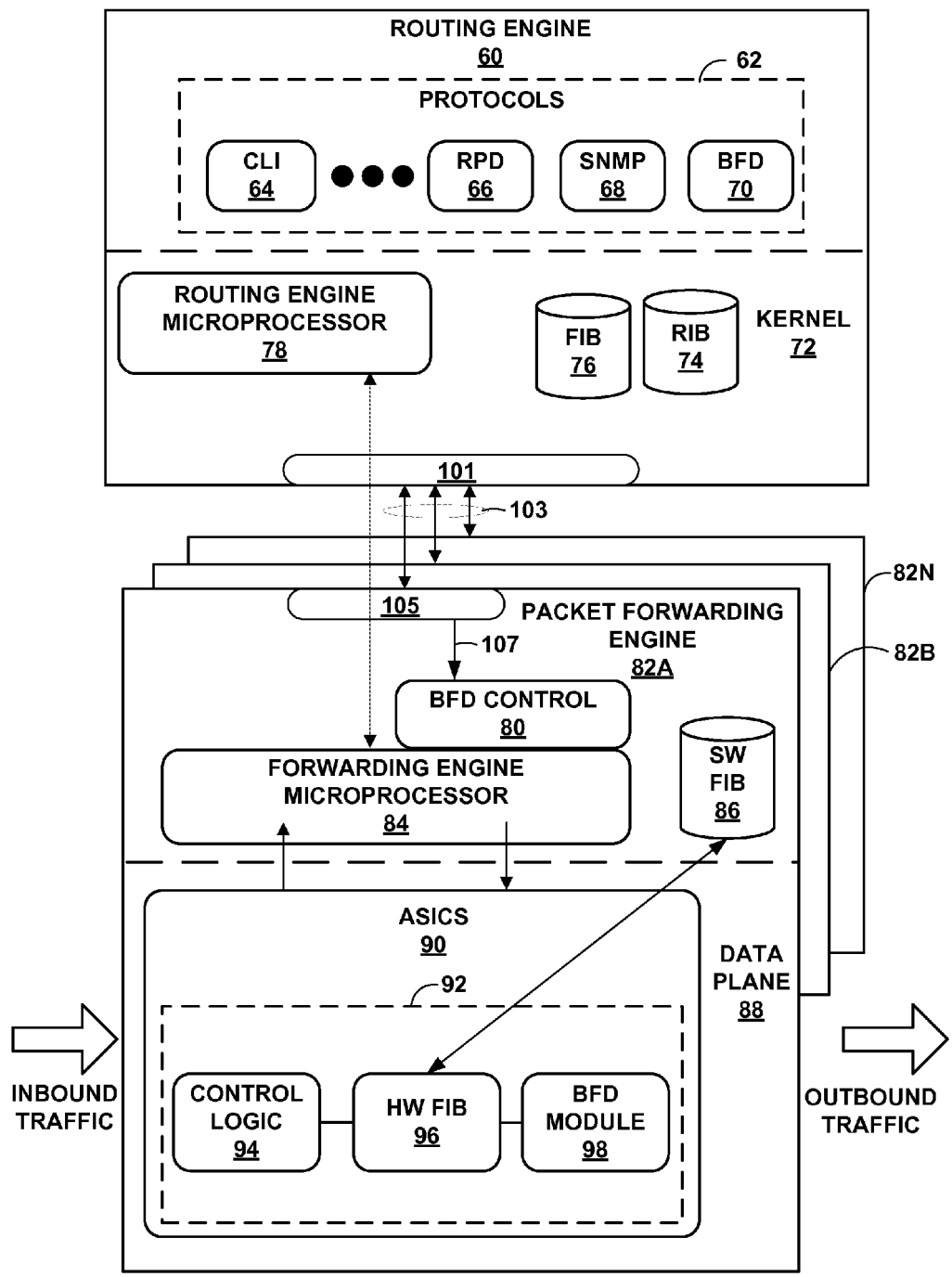
FIG. 3 is a block diagram illustrating further details of a routing engine and a packet-forwarding engine of a router, in accordance with one or more aspects of this disclosure.

FIG. 3 is a block diagram illustrating further details of an example routing engine 60 and an example packet-forwarding engine 82A of router having a plurality of forwarding engines 82A-83N. The components of FIG. 3 may, for example, represent a more detailed example of any of routers 12 of FIG. 1 or router 30 of FIG. 2.

In this example, routing engine 60 includes high-level, control plane software processes 62. In this example, software processes include command-line interface daemon 64 ("CLI 64"), routing protocol daemon 66 ("RPD 66"), and Simple Network Management Protocol daemon 68 ("SNMP 68"). In this respect, routing engine 60 may provide routing plane, service plane, and management plane functionality for the router. Various instances of routing engine 60 may include additional software processes 62 not shown in FIG. 3 that perform other control, management, or service plane functionality and/or drive and otherwise manage data plane functionality for router 30.

RPD 66 interacts with kernel 72 (e.g., by way of API calls) to update routing information base (RIB) 74 based on routing protocol messages received by router 30. RPD 66 may, for example, execute various routing protocols, such as LDP and RSVP to establish LSPs within a network. RIB 74 may include information defining a topology of a network, including one or more routing tables and/or link-state databases. Kernel 43 executes on routing engine microprocessor 78 and may comprise, for example, a UNIX operating system derivative such as Linux or Berkeley Software Distribution (BSD). Kernel 72 processes kernel calls from RPD 66 and generates forwarding information in the form of FIBs 76 based on the network topology represented in RIB 74, i.e., performs route resolution. Typically, RPD 66 generates FIB 76 in the form of radix or other lookup tree to map packet information (e.g., header information having destination information and/or a label stack) to next hops and ultimately to interface ports of interface cards associated with respective PFEs 82. Routing engine microprocessor 78 of kernel 72 then communicates with communication interface 105 of PFE 82A by way of communication interface 101 and internal communication link 103. Routing engine microprocessor 78 may program PFEs 82 and install copies of the FIBs as software FIB 86. Microprocessor 78 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 90 are microcode-controlled chipsets programmably configured by a forwarding engine microprocessor 84 executing on each of PFEs 82A-82N (e.g., PFE 82A). Specifically, one or more of ASICs 90 is controllable by microcode 92 programmed by forwarding engine microprocessor 84. The forwarding engine microprocessor 84 programs a hardware FIB 96 into internal memory of ASIC 90 within the data plane 88 based on software FIB 86. When forwarding packets, control logic 94 traverses HW FIB 96 and, upon reaching a FIB entry for the packet (e.g., a leaf node), microcode-implemented control logic 94 automatically selects a forwarding next hop and processes the packets in accordance with the operations defined within the next hop. Additionally, microcode 92 includes BFD module 98, which implements various functionalities in accordance the BFD protocol. As examples, BFD module 98 outputs enhanced BFD packets to embed status information as to communications between PFE 82A and routing engine 60.

Command line interface daemon 64 ("CLI 64") provides an interface by which an administrator or other management entity may modify the configuration of router 30 using text-based commands. Simple Network Management Protocol daemon 68 ("SNMP 68") comprises an SNMP agent that receives SNMP commands from a management entity to set and retrieve configuration and management information for router 30. Using CLI 64, SNMP 68, and BFD 70, management entities may enable/disable and configure services, install routes, enable/disable and configure rate limiters, and configure interfaces, for example. RPD 66, CLI 64, SNMP 68, and BFD module 70 configure router 30 to implement configured services, add/modify/delete routes, and otherwise modify packet forwarding paths by installing forwarding structures to PFEs 82.

In accordance with the techniques described herein, forwarding engine microprocessor 84 implements BFD control 80. BFD control 80, in turn, implements one or more of the techniques described herein. More specifically, microcode-implemented BFD module 98 is configured by BFD control 80, responsive to signal 107, to generate outbound BFD packets to include an indication of an impending control plane disruption using forwarding plane liveliness detection protocols routing engine 60. Moreover, BFD module 98 may, when processing inbound BFD packets, extract information as to an impending control plane disruption of routing components of peer routers and provide such information to BFD control 80 for relaying to other control plane of routing engine 60. For example, upon detecting via an inbound BFD packet that a forwarding component of a peer router remains operational but has been informed of or otherwise detected an upcoming disruption to its control plane, any of control logic 94 of forwarding ASICs 90, forwarding engine microprocessor 84, and/or components of routing engine 60 may alter operation. For example, RPD 66 may, upon subsequently detecting loss of communication with the control plane of the peer router, suppress reroute of traffic around the router, at least until expiration of one or more timers. As other examples, other protocols 62 may suppress or otherwise delay triggering a recovery process.

FIG. 4 is a diagram illustrating an exemplary BFD control message 138 that may be sent by a packet forwarding component of a router, e.g., router 12B of FIG. 1, with respect to liveliness detection of the forwarding plane within a network. In this example, control message 138 complies with the BFD protocol, such as BFD 28D of FIG. 2A, so that only certain changes need be implemented to the protocols executing on the sending or receiving forwarding components of the routers. Control message 138 therefore may be referred to below as "BFD control message 138." BFD control message 138 may further be formulated as a packet and receive the moniker of "BFD control packet 138." Again, although described in reference to the BFD protocol and BFD control message 138 in particular, the techniques may apply to any protocol that uses periodic messages to detect liveliness of the forwarding plane and that may be modified, as described herein, to also provide a status of internal communications between the forwarding plane and the control plane of the sending router.

In the example shown in FIG. 4, BFD control message 138 comprises 6 rows of 32 bits (0-31 across the top of BFD control message 138 in FIG. 3). BFD control message 138 further comprises fields 140A-40K ("fields 140"), where each of fields 140 may specify information relevant to specifying a response interval. Version field 140A, for example, specifies the version number of the protocol, which may enable the receiving router to determine whether it supports BFD control message 138. Diagnostic field 140B specifies a coded reason for the last session state change to states of "Down" or "AdminDown." State field 140C specifies the current BFD session state as seen by the router transmitting BFD control message 138. Typical, BFD session states comprises "AdminDown," "Down," "Init," and "Up." Modes field 140D comprises a number of bits, where each bit specifies a particular BFD session mode. For example, one bit of modes field 140D may specify whether the session requires authentication, e.g., whether the session is in "authentication mode."

Detection timer multiplier field 140E specifies a value that when multiplied by the value specified within desired minimum transfer interval 140I provides the detection time for the router transmitting BFD control message 138 in "asynchronous mode." Length field 140F specifies the length of BFD control message 138 in bytes. My discriminator field 140G specifies a unique, nonzero discriminator value generated by the router transmitting BFD control message 138. My discriminator field 140G may be used to demultiplex multiple BFD sessions between the same set of receiving and transmitting routers. Your discriminator field 140H specifies the discriminator received from the corresponding router of the particular BFD session. Your discriminator field 140H may specify a zero value, if the discriminator of received from the corresponding router is unknown by the transmitting router.

Desired minimum transfer interval field 140I specifies the minimum interval, in microseconds, that the local system would like to use when transmitting BFD control message 138 and subsequent BFD control messages. Required minimum receive interval field 140J specifies the minimum interval, in microseconds, between received BFD control messages that the router transmitting BFD control message 138 is capable of supporting. If the transmitting router sets required minimum receive interval field 140J to zero, the transmitting router does not want the remote or receiving router to send any periodic BFD control messages. Required minimum echo receive interval field 140K specifies the minimum interval, in microseconds, between received BFD echo messages that the transmitting router is capable of supporting. Specifying a zero to this field indicates that the transmitting router does not support the receipt of BFD echo packets.

A router, such as any of the routers of FIGS. 1-3, may therefore generate and output BFD control message 138. In general, the techniques described herein may use any mechanism for embedding information within BFD control message 138 to convey a status of internal communications between a forwarding plane and a control plane of the sending router, thereby providing an indication as to whether the forwarding information used by the forwarding plane is current or stale. In one example, the transmitting router utilizes one or more bits or sets one or more codes within diagnostic field 140B to convey this additional information. For example, BFD diagnostic codes may be defined as follow:

TABLE 2

| CODE WORD | MEANING |
|---|---|
| 0 | No Diagnostic |
| 1 | Control Detection Time Expired |
| 2 | Echo Function Failed |
| 3 | Neighbor Signaled Session Down |
| 4 | Forwarding Plane Reset |
| 5 | Path Down |
| 6 | Concatenated Path Down |
| 7 | Administratively Down |
| 8 | Reverse Concatenated Path Down |
| 9 | Planned Graceful Restart of the Control Plane |
| 10 | Unplanned Graceful Restart of the Control Plane |
| 11 | Warm restart of the Control Plane |
| 12 | Planned ARP disruption within the Control Plane |
| 13 | Planned ND disruption within the Control Plane |
| 14 | Planned Routing Protocol (RPD) disruption within the Control Plane. |

In the above example, an additional code word '9' has been defined for diagnostic field 140B to indicate an impending disruption in the control plane.

As another example, BFD message 139 may include an additional type-length-value (TLV) field so as to include the additional information. Moreover, BFD message 139 may further include an optional field indicating an expected duration of the impending event. For further information concerning the BFD protocol generally, BFD control message, and BFD control message fields, see the Internet Draft published by the Network Working Group of the Internet Engineering Task Force (IETF), titled "Bidirectional Forwarding Detection," written by D. Katz and D. Ward, and dated March, 2007, the entire contents of which are hereby incorporated by reference as if fully set forth herein.

Figure 5:
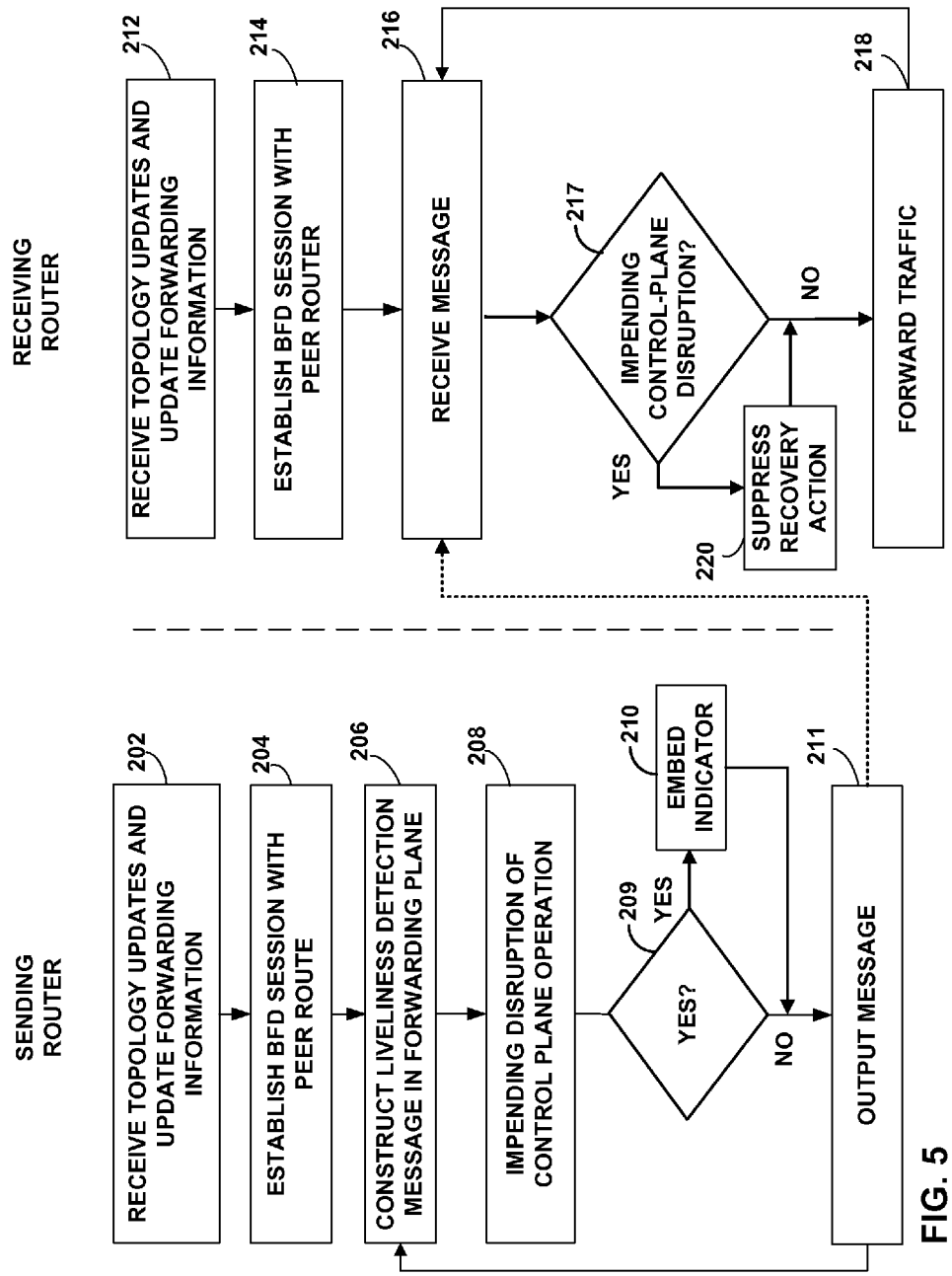
FIG. 5 is a flowchart illustrating example processes by which routers operate in accordance with one or more aspects of this disclosure.

FIG. 5 is a flowchart illustrating example operation of two routers in accordance with the techniques described here. For purposes of example, a first one of the routers is referred to as the "sending router" and a second one of the routers is referred to as a "receiving router."

In operation, control plane components of the routers receive control plane routing protocol messages from other routers and, in response, update topology information and perform route selection (202, 212).

In addition, the packet forwarding components of the routers establish a communication session in accordance with the forwarding-plane liveliness detection protocol, such as BFD (204, 214). The forwarding plane liveliness detection protocol may, for example, comprise a bidirectional forwarding detection (BFD) protocol. At this time, the two packet forwarding components of the routers begin exchanging liveliness detection messages that, when received by the other router, provide an indication that the packet forwarding engines are operational and able to forward packets.

In the example of FIG. 5, the packet forwarding component of the sending router constructs a liveliness detection message in accordance with the forwarding-plane liveliness detection protocol (206). At this time, the packet forwarding component of the sending router may be informed of, or otherwise detect, an impending disruption of operation of its control plane (208). As explained herein, an impending disruption of operation indicates that operation of the control plane may in the near future be compromised such that at that point control-plane communication with peer routers or controllers may be lost. For example, the routing engine(s) of the router may be undergoing a planned in-service software upgrade (ISSU), where loss of communication between the routing components and the peer routers may be compromised.

In the event the packet forwarding component determines that loss of control plane operation is impending (YES OF 209), the packet forwarding component includes within the liveliness detection message an indicator of such impending disruption (210). If no fault condition is detected, the packet forwarding engine does not include the indicator within the liveliness detection message.

After construction, the packet forwarding component of the sending router outputs the liveliness detection message to a peer network device in accordance with the forwarding plane liveliness detection protocol (211). The packet forwarding component of the sending router repeats this transmission at a high rate, such as every 1-10 ms to provide an indication of the operational status of the forwarding plane of the sending router.

Receipt of the liveliness detection message by the packet forwarding component of the receiving router confirms to the receiving router that the packet forwarding component of the sending router is currently able to forward packets (216). In addition, the packet forwarding component of the receiving router further processes the received liveliness detection message to detect whether the packet forwarding component of the packet forwarding engine has determined that the control plane of the sending router has been marked for impending operational disruption (217).

If no impending loss of control plane functionality has been indicated in the inbound liveliness detection message, the receiving router continues to forward traffic according to normal operation (218).

However, if the liveliness detection message indicates an impending loss of control plane operation for the sending router, the receiving router may reconfigure its control place and/or forwarding plane to at least temporarily suppress certain actions, such as rerouting of packet flows or control-plane recovery processes in the event control-plane communications are subsequently lost with the sending router (220).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    using, by a control plane of a network device, one or more routing protocols to exchange network topology information with one or more other network devices, the one or more other network devices including a peer network device;
    programming, by the control plane of the network device, a packet forwarding component of the network device to forward packets in accordance with the network topology information;
    detecting, by the packet forwarding component, that a disruption to operation of the control plane of the network device is impending, wherein the disruption to operation of the control plane compromises control plane communication between the control plane of the network device and the peer network device;
    constructing, by the packet forwarding component of the network device, a liveliness detection message in accordance with a forwarding-plane liveliness detection protocol, wherein the liveliness detection message comprises an indication that the disruption to operation of the control plane is impending; and
    outputting, by the packet forwarding component, the liveliness detection message to the peer network device in accordance with the forwarding plane liveliness detection protocol.

2. The method of claim 1,
    wherein detecting that the disruption to operation of the control plane of the network device is impending comprises detecting, by the packet forwarding component, that a disruption to operation for a particular protocol of a plurality of protocols used by the control plane is impending, and wherein constructing the liveliness detection message comprises constructing, by the packet forwarding component, the liveliness detection message to include an indication of the particular protocol for which the packet forwarding component detects the disruption of operation of the control plane is impending.

3. The method of claim 2, further comprising constructing the liveliness detection message to comprise a time value specific to the particular protocol for which the packet forwarding component detects the disruption of operation of the control plane is impending, and wherein the time value specifies a duration for which the peer network device is to suppress a recovery process associated with loss of communication for the particular protocol.

4. The method of claim 1, further comprising constructing the liveliness detection message to comprise a time value, wherein the time value specifies a duration for which the peer network device is to suppress a recovery process associated with loss of communication with the control plane of the network device.

5. The method of claim 1, wherein the liveliness detection message is a first liveliness detection message, the method further comprising:

constructing, by the packet forwarding component, a second liveliness detection message in accordance with the forwarding-plane liveliness detection protocol, wherein the second liveliness detection message comprises an indication that the disruption to operation of the control plane has completed; and outputting, by the packet forwarding component, the second liveliness detection message to the peer network device in accordance with the forwarding plane liveliness detection protocol.

6. The method of claim 1, wherein the forwarding plane liveliness detection protocol comprises a bidirectional forwarding detection (BFD) protocol, an Address Resolution Protocol (ARP) or a Neighbor Discover (ND) protocol.

7. The method of claim 1, wherein the disruption comprises an in-service software upgrade to the control plane of the network device.

8. A network device comprising:

a control plane that comprises a routing component, the control plane of the network device using one or more routing protocols to exchange network topology information with one or more other network devices, the one or more other network devices including a peer network device;

a packet forwarding component of the network device programmed by the control plane to forward packets in accordance with the network topology information; and wherein the packet forwarding component is configured to:

exchange liveliness detection messages with a packet forwarding component of the peer network device in accordance with a forwarding-plane liveliness detection protocol;

detect that a disruption to operation of the control plane of the network device is impending; and responsive to detecting that disruption to operation of the control plane of the network device is impending, the packet forwarding component:

constructs a particular liveliness detection message in accordance with the forwarding plane liveliness detection protocol, the particular liveliness detection message comprising an indication that the disruption to operation of the control plane of the network device is impending, wherein the disruption to operation of the control plane of the network device compromises communication between the control plane of the network device and the peer network device; and outputs the particular liveliness detection message to the peer network device in accordance with the forwarding plane liveliness detection protocol.

9. The network device of claim 8, wherein:

the disruption to operation of the control plane of the network device comprises a disruption to operation of the control plane for a particular protocol of a plurality of protocols used by the control plane of the network device, and the packet forwarding component of the network device constructs the particular liveliness detection message to include an indication of the particular protocol for which the packet forwarding component detected that disruption of operation of the control plane is impending.

10. The network device of claim 9, wherein the packet forwarding component constructs the liveliness detection message to comprise a time value specific to the particular protocol for which the packet forwarding component detected the disruption of operation of the control plane is impending, wherein the time value specifies a duration for which the peer network device is to suppress a recovery process associated with loss of communication for the particular protocol.

11. The network device of claim 8, wherein the packet forwarding component constructs the particular liveliness detection message to comprise a time value, wherein the time value specifies a duration for which the peer network device is to suppress a recovery process associated with loss of communication with the routing component of the network device.

12. The network device of claim 8, wherein:

the particular liveliness detection message is a first liveliness detection message, the packet forwarding component constructs a second liveliness detection message in accordance with the forwarding-plane liveliness detection protocol, the second liveliness detection message comprises an indication that the disruption to operation of the control plane of the network device has completed, and wherein the packet forwarding component outputs the second liveliness detection message to the peer network device in accordance with the forwarding plane liveliness detection protocol.

13. The network device of claim 8, wherein the forwarding plane liveliness detection protocol comprises a bidirectional forwarding detection (BFD) protocol.

14. The network device of claim 8, wherein the disruption comprises an in-service software upgrade to the control plane of the network device.

15. A network device comprising:

a control plane that comprises a routing component, the control plane of the network device using one or more routing protocols to exchange network topology information with one or more other network devices, the one or more other network devices including a peer network device; and a packet forwarding component of the network device programmed by the control plane of the network device to forward packets in accordance with network topology information, wherein:
  the packet forwarding component of the network device uses a forwarding-plane liveliness detection protocol to receive liveliness detection messages from the peer network device,
  a particular liveliness detection message of the liveliness detection messages comprising an indication that a disruption to operation of a control plane of the peer network device is impending, wherein the disruption to operation of the control plane of the peer network device compromises communication between the control plane of the network device and the control plane of the peer network device, and
wherein the control plane of the network device, in response to receipt of the particular liveliness detection message by the packet forwarding component, suppresses a recovery process otherwise triggered by a loss of communication with the control plane of the peer network device.

16. The network device of claim 15, wherein the control plane of the network device suppresses reroute of one or more packet flows around the peer network device in response to receipt of the particular liveliness detection message by the packet forwarding component of the network device.

17. The network device of claim 15,
  wherein the particular liveliness detection message includes a time value specific to a particular protocol of a plurality of protocols used by the control plane of the network device, and
  wherein the routing component, in response to receipt of the first one of the liveliness detection message by the packet forwarding component, suppresses a recovery action otherwise triggered by a loss of communication with the peer network device by the particular protocol.

18. The network device of claim 15, wherein the forwarding plane liveliness detection protocol comprises a bidirectional forwarding detection (BFD) protocol, an Address Resolution Protocol (ARP) or a Neighbor Discover (ND) protocol.

19. The network device of claim 15, wherein the disruption comprises an in-service software upgrade to the control plane of the peer network device.

\* \* \* \* \*